Oct. 7, 1947.  A. J. MOORE  2,428,675
DEVICE FOR UPSETTING METAL
Filed Oct. 28, 1943
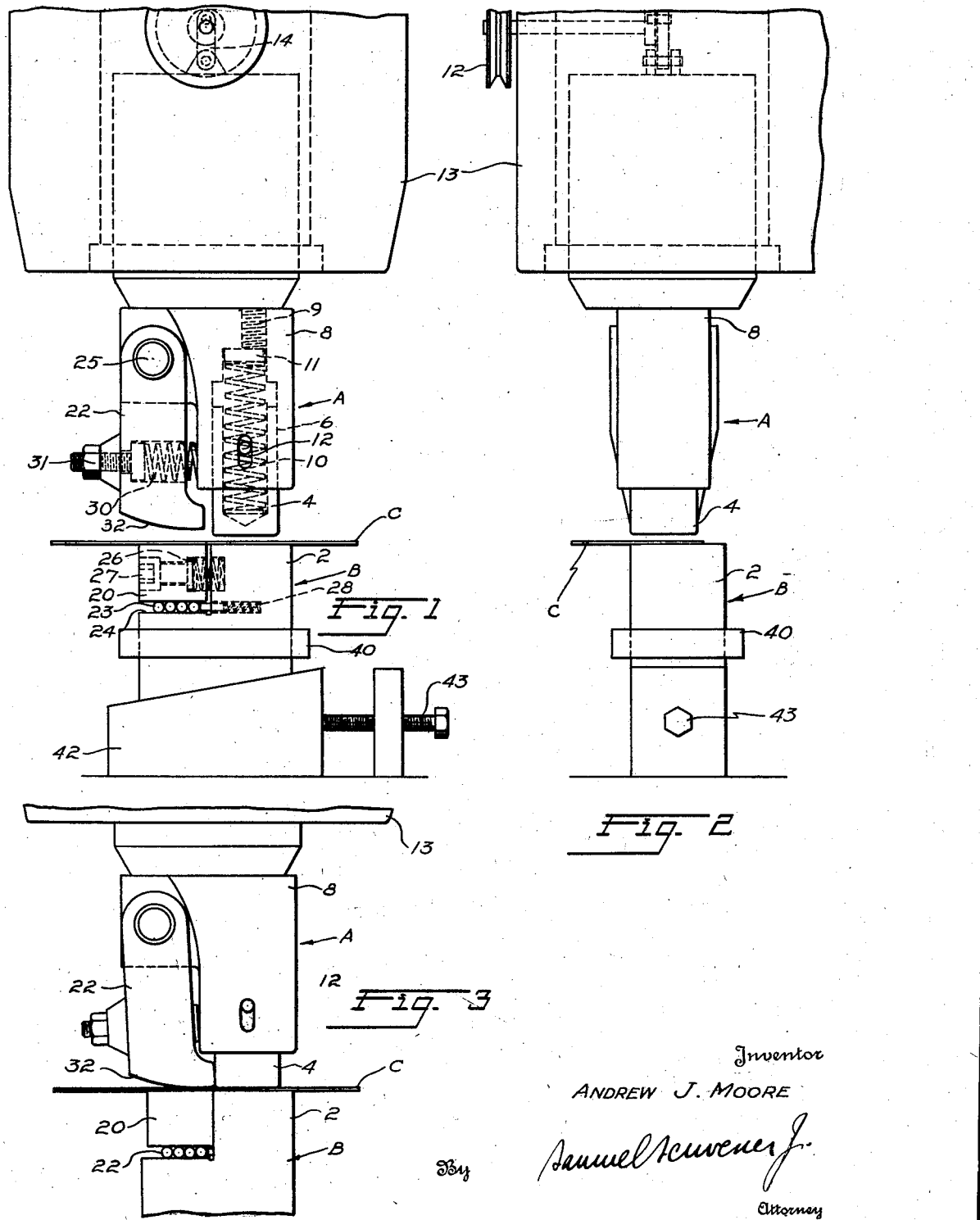
Inventor
ANDREW J. MOORE Patented Oct. 7, 1947

2,428,675

UNITED STATES PATENT OFFICE 2,428,675

DEVICE FOR UPSETTING METAL

Andrew J. Moore, Washington, D. C., assignor to Engineering and Research Corporation, Riverdale, Md., a corporation of Maryland Application October 28, 1943, Serial No. 508,075

1 Claim. (Cl. 78—61)

This invention relates to the art of metal forming and, more particularly, to the art of upsetting metal by shrinking or stretching it.

Known and useful devices for shrinking metal comprise a pair of jaws which may be moved toward each other into engagement with the opposite faces of a piece of metal to clamp the same therebetween, a second pair of jaws which is operable in the same way to clamp the metal therebetween over an area removed from the area of operation of the first jaws, and some means to move the two pairs of jaws toward each other while maintaining their clamping engagement with the metal. It is particularly pointed out that in such known devices both of the pairs of jaws are moved in order to bring them together to effect the shrinking operation. Such operation of both pairs of jaws has required rather complicated and expensive machinery and has not always been satisfactory for the reason that unless both pairs of jaws move exactly the same distance when coming together wrinkling is liable to develop.

It has accordingly been the object of this invention to provide a metal shrinking or stretching machine which would not be subject to the disadvantages of known machines and, in particular, would not cause wrinkling and other undesirable effects inherent in machines in which the two pairs of jaws move toward each other in the shrinking operation. A further object of the invention has been to provide metal shrinking and stretching means which are simpler than those now known and used and in which the need for relatively complicated means for moving both pairs of jaws is obviated.

These objects of the invention have been provided by the device described and illustrated hereinafter. It will be understood, however, that the description and drawings forming part of this application are only illustrative of the invention and impose no limitation thereon not imposed by the appended claim.

Referring to the drawings, in which similar reference characters refer to like parts, Fig. 1 is a front elevational view of a machine embodying shrinking means according to this invention and showing the parts thereof in inoperative position;

Fig. 2 is a side view of the machine shown in Fig. 1, and

Fig. 3 is a front elevational view showing the shrinking means in operative or shrinking position.

By this invention I provide a device for shrinking or stretching metal, comprising means for clamping one area of a work piece therebetween in order to prevent wrinkling or distortion and in order to prevent any undesired movement of the work piece, and other means which operate to force another area of the work piece in the direction of that held by the clamping means and to simultaneously clamp the opposite faces of the second area of the work piece in order to prevent wrinkling or distortion thereof. As illustrated in the drawings, these means comprise an upper head A and a lower head B each of which includes one of the clamping jaws and one of the shrinking jaws. The clamping means comprise a fixed lower abutment or jaw 2 having a preferably rectangular flat upper surface, on which a work piece C is adapted to be supported, and an upper abutment or jaw 4 having a preferably rectangular lower working face which is disposed vertically above the flat upper surface of the lower part 2. The upper jaw 4 is slidably received in a vertically elongated recess 6 in a supporting head 8 and is normally urged downwardly therein by a spring 10, the force of which may be varied by an adjusting screw 9, between which and the spring there is interposed a washer 11. Downward movement of the jaw 4 is limited by a pin and slot arrangement 12, the parts of which are respectively mounted on the jaw 4 and head 8. The jaw 4 and recess 6 preferably have the same cross-sectional size and shape in order to provide a snug sliding fit for the jaw.

The pair of shrinking jaws provided by the invention comprise a lower jaw 20 and an upper jaw 22 which are arranged one above the other at the side of the clamping jaws and normally held slightly away therefrom by means and for reasons to be described hereinafter. The lower jaw 20 comprises a block which is preferably supported on rollers 23 resting on a horizontal surface 24 which is preferably formed integrally with the fixed jaw member 2 and below the upper surface thereof. The parts are so constructed and arranged that the upper surface of the jaw 20 is at the same level as that of the fixed jaw 2, whereby both are adapted to support the work piece C in level position, and the jaw 20 is movable toward and away from the fixed jaw in the direction in which the metal is to be shrunk. The jaw 20 is constantly urged away from the fixed jaw 2 by a spring 26 which is disposed between the two parts and the force of which may be varied by an adjusting screw 27. The rollers 23 are also constantly urged by spring 28 in the same direction as is the block 20. The upper shrinking jaw 22 comprises a vertically elongated member disposed vertically above the block 20, pivotally supported at its upper end 25 on the head 8, and constantly held away from jaw member 4 by a spring 30, the inner end of which engages the head 8 and the other end of which is disposed within a recess within jaw 22. The protruding length of spring 30, and consequently the spacing between jaws 22 and 4, may be varied by an adjusting screw and nut arrangement 31. The lower or working face 32 of the jaw member 22 is arcuate and convex, the lowest point thereof being adjacent the jaw member 4. The parts are so proportioned and arranged that when the head 8 is in its raised portion, as shown in Fig. 1, the lowest point of the arcuate working face 32 is disposed slightly above the working face of the jaw member 4 and is displaced laterally of a vertical line through the pivot 25 in the direction of the jaw 4.

The upper head A is mounted in the machine frame for reciprocation toward and away from the work piece and means, such as the pulley 12 and eccentric 14, are provided for the purpose of giving continuous and rapid reciprocatory movement to the head 8 and the jaw members carried thereby. The lower head B is supported in machine frame 40 for adjusting movement toward and away from the upper head. In order to effect such adjustment, the lower shrinker head is provided with an inclined lower end which co-operates with the inclined upper face of a wedge 42 which may be laterally adjusted by screw means 43 to raise or lower the head.

In the operation of the described device, the laterally-movable lower shrinker jaw 20 is normally held slightly away from the fixed lower clamping jaw 2 by spring 26, and a work piece C may be positioned on the lever upper surface of the two jaws. Also, the upper shrinking jaw 22 is held by spring 30 in position removed from the jaw 4, as shown in Fig. 1. If power is now applied to the pulley 12 the upper head B will be given a rapid and continuous reciprocation. As the head moves downwardly the jaw member 4 is carried with it until the working face thereof engages the work piece, after which continued downward movement of the head causes compression of spring 10, thereby causing strong downward pressure to be exerted through the jaw member onto the work piece, whereby the work piece is firmly and rigidly clamped between the flat working faces of the jaw members 2 and 4. Such downward movement of the upper head B is sufficient to cause the low point of arcuate working surface 32 of the upper shrinker jaw 22 to engage the upper surface of the work piece, thereby firmly clamping the work piece between the upper surface of lower shrinker jaw 20 and the low part of the surface 32. Continued downward movement of the head B will cause a downward force to be exerted on jaw 22 through the pivotal support thereof which, being laterally displaced from the low point of the arcuate working face 32 in a direction away from that in which the metal of the work piece is to flow in the shrinking operation, will cause the jaw 22 to turn about the pivotal support at the upper end thereof in such a direction as to move the lower end of the jaw member 22 toward the fixed jaw members. In so moving, the working face of the jaw 22 will force that part of the work piece clampingly held between the working face and the flat upper surface of the lower shrinker jaw 20 to move toward the fixed jaws 2, 4 and the movement of the upper jaw and the metal of the work piece will also cause the lower movable jaw 20 to move toward the lower fixed jaw 2, the rollers 22 moving against the spring 28 in order to permit relatively frictionless movement of the jaw 20. The positions of the various parts at this time are shown in Fig. 3. Upon upward movement of the head A the springs 10, 26, 28 and 30 will move the jaws 4, 20 and 22, respectively, to their normal positions as shown in Fig. 1.

It will be seen therefore that as the machine is operated the work piece will first be clamped, over one area, between the upper and lower clamping jaws 2, 4, after which an adjoining area of the work piece will be clamped between the working faces of the upper and lower movable, or shrinking, jaws 20, 22 and, simultaneously therewith, the metal held between the shrinking jaws will be moved toward that part of the work piece clamped between the jaws 2 and 4, such movement being effected by reason of the movement of the working face of the upper movable jaw about the pivot of that jaw while being held in tight engagement with the upper surface of the work piece and the simultaneous movement of the lower shrinking jaw 20, which permits shrinking movement of the metal. This operation is continuously and rapidly repeated by reciprocation of the head B, resulting in shrinking of the work piece.

Although the invention has been described herein as particularly applied to a metal shrinking machine, it is equally useful for metal stretching and may be so used and applied within the scope of the invention. Further, while the description refers in certain places to vertical or up and down reciprocation, or to right and left position or movement, it will be understood that these terms place no limitation on the invention, being merely illustrative of one mode of operation or location. Thus, reference to the various jaws and members as "upper" or "lower" is not to be construed as a limitation, as the machine according to the invention may be positioned and operated with the jaws and other parts thereof to the right and left of the work piece, or otherwise.

While I have described and illustrated one form which my invention may take, it will be apparent to those skilled in the art that other embodiments of the invention may be made, as well as modifications of that disclosed, all of which may be done without departing in any way from the spirit or scope of the invention, for the limits of which reference must be had to the appended claim.

I claim:

A machine for upsetting metal by shrinking it comprising a vertically reciprocable head having a recess therein opening at the lower end of the head, a jaw mounted in said recess for vertical movement only therein and having a substantially flat horizontal lower end face, means constantly urging said jaw outwardly of the recess, means limiting the movement of the jaw into and out of the recess and preventing the movement thereof entirely into the recess, a second jaw pivoted at its upper end on said head and depending from its pivotal support in side-by-side relation with the first jaw and having a downwardly convex lower end face which is normally positioned slightly above the lower face of the first jaw and the lowest part of which is most closely adjacent the first jaw, resilient means resisting movement of said jaws toward each other, a third jaw disposed below the first jaw and comprising a fixed member having a flat horizontal upper surface on which a work-piece is clamped by the lower end of the first jaw upon downward movement of said head, a fourth jaw disposed below the second jaw and comprising a member movable toward and away from the third jaw and having an upper surface on which a work-piece is clamped by the lower end of the second jaw upon downward movement of the head, and resilient means resisting movement of said third and fourth jaws toward each other.

ANDREW J. MOORE.

REFERENCES CITED

The following references are of record in the file of this patent:

UNITED STATES PATENTS

| Number | Name | Date |
|---|---|---|
| 126,495 | Seward | May 7, 1872 |
| 1,530,272 | McDermott | Mar. 17, 1925 |
| 1,761,887 | Junkers | June 3, 1930 |
| 1,761,888 | Junkers | June 3, 1930 |
| 2,010,996 | Junkers | Aug. 13, 1935 |
| 2,023,638 | Lawson | Dec. 10, 1935 |
| 2,202,018 | McCutcheon | May 28, 1940 |

FOREIGN PATENTS

| Number | Country | Date |
|---|---|---|
| 11,660 | Great Britain | 1897 |
| 160,816 | Great Britain | June 29, 1922 |